(12) United States Patent
Lee et al.

(10) Patent No.: US 8,327,418 B2
(45) Date of Patent: Dec. 4, 2012

(54) PRESENTATION APPARATUS WITH BROADCASTING FUNCTION AND METHOD USING THE SAME

(75) Inventors: Jin Wook Lee, Yongin-si (KR); Su Myeon Kim, Yongin-si (KR); Hun Lim, Yongin-si (KR); Won Keun Kong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 11/723,286

(22) Filed: Mar. 19, 2007

(65) Prior Publication Data
US 2008/0100532 A1      May 1, 2008

(30) Foreign Application Priority Data
Oct. 25, 2006   (KR) .................. 10-2006-0103922

(51) Int. Cl.
*G06F 7/04* (2006.01)
(52) U.S. Cl. ................. 726/2; 345/7; 370/466; 340/501
(58) Field of Classification Search .......... 726/2; 345/7; 370/466; 340/501
See application file for complete search history.

(56) References Cited

U.S. PATENT DOCUMENTS

| | | | |
|---|---|---|---|
| 6,535,118 B1 * | 3/2003 | Takagi et al. | 340/501 |
| 2002/0118151 A1 * | 8/2002 | Chen | 345/84 |
| 2003/0098819 A1 | 5/2003 | Sukthankar et al. | |
| 2005/0036509 A1 | 2/2005 | Acharya et al. | |

FOREIGN PATENT DOCUMENTS

| | | |
|---|---|---|
| JP | 2004-139365 A | 5/2004 |
| JP | 2005-150825 A | 6/2005 |
| KR | 10-2005-0016665 A | 2/2005 |
| KR | 10-2006-0064741 A | 6/2006 |

OTHER PUBLICATIONS

Reilly. (2005). (WiFi PDA Meets Linux—Part 3). Retreived May 26, 2010 from http://www.linuxplanet.com/linuxplanet/tutorials/5872/1/.*
Unyte (Jan. 2006). Unyte: A free skype enabled desktop sharing tool. Retrieved Apr. 11, 2011 from http://www.radiojames.com/jblog/2006/01/unyte-a-free-skype-enabled-desktop-sharing-tool/.*

* cited by examiner

*Primary Examiner* — Jeffrey D Popham
*Assistant Examiner* — Brian Shaw
(74) *Attorney, Agent, or Firm* — Sughrue Mion, PLLC (57) ABSTRACT

A presentation apparatus includes: a communication connection establishing unit establishing a communication connection with a plurality of receiving terminals and a source terminal, the source terminal having a token corresponding to an authority of controlling a presentation; a presentation data relay unit receiving presentation data from the source terminal, broadcasting a presentation image to the plurality of receiving terminals to display the presentation image of the received presentation data on each screen of the plurality of receiving terminals, and broadcasting voice information to the source terminal and the plurality of receiving terminals to output, from each terminal, the voice information being inputted from any one of the source terminal and the plurality of receiving terminals; and a presentation control unit controlling a transmission/reception of the presentation image and the voice information, and controlling a receiving terminal requesting the token to obtain the token.

14 Claims, 7 Drawing Sheets

PRESENTATION APPARATUS WITH BROADCASTING FUNCTION AND METHOD USING THE SAME

CROSS-REFERENCE TO RELATED APPLICATIONS

This application claims priority from Korean Patent Application No. 10-2006-0103922, filed on Oct. 25, 2006, in the Korean Intellectual Property Office, the entire disclosure of which is incorporated herein by reference.

BACKGROUND OF THE INVENTION

1. Field of the Invention

The present invention relates to a presentation apparatus and method, and more particularly, to a presentation apparatus and method having a broadcasting function of broadcasting presentation data to a plurality of receiving terminals connected by a local wireless communication connection.

2. Related Art

A related art presentation apparatus is an apparatus for making a presentation, and the presentation apparatus performs a function of receiving presentation data from a specific terminal, and transmitting the presentation data to a screen.

A related art projector corresponding to a representative example of the presentation apparatus is an apparatus for enabling persons present in a presentation location to watch presentation contents by transmitting, to a screen via a lens, a presentation image received from a computer connecting with the projector by a wired/wireless connection.

The above related art presentation apparatus may simply check the presentation contents only when an attendant is present in the presentation location. Specifically, a person away from the presentation location may not check the presentation contents, and therefore, the person may not know the presentation processing status.

Therefore, a presentation apparatus capable of checking presentation contents via a terminal from a long distance, where an attendant is away from a presentation location, and directly participating in a presentation, is required.

SUMMARY OF THE INVENTION

The present invention provides a presentation apparatus and method having a broadcasting function of broadcasting a presentation image and a voice received from a terminal, and a presentation apparatus and method of ensuring security with respect to presentation contents by broadcasting an image and a voice in a streaming method.

The present invention also provides a presentation apparatus and method of broadcasting presentation contents where security is ensured, with a counterpart terminal located in another location away from a presentation location, as well as a presentation apparatus and method of assigning, to a receiving terminal requesting a token, the token controlling a presentation according to a permission of a source terminal providing the presentation.

According to an aspect of the present invention, there is provided a presentation apparatus including: a communication connection establishing unit establishing a communication connection with a plurality of receiving terminals and a source terminal, the source terminal having a token corresponding to an authority of controlling a presentation; a presentation data relay unit receiving presentation data from the source terminal, broadcasting a presentation image to the plurality of receiving terminals to display the presentation image of the received presentation data on each screen of the plurality of receiving terminals, and broadcasting voice information to the source terminal and the plurality of receiving terminals to output, from each terminal, the voice information being inputted from any one of the source terminal and the plurality of receiving terminals; and a presentation control unit controlling a transmission/reception of the presentation image and the voice information, and controlling the receiving terminal requesting the token to obtain the token.

The communication connection establishing unit may establish a local wireless communication connection with the plurality of receiving terminals and the source terminal using characteristic information of the terminals transmitted from the plurality of receiving terminals and the source terminal.

The presentation apparatus further includes: a priority order determining unit determining a priority order of the plurality of receiving terminals, wherein the presentation control unit enables the receiving terminal having the highest priority among the plurality of receiving terminals requesting the token to obtain the token.

The presentation control unit may respond to a token request of any one of the plurality of receiving terminals, and enable the receiving terminal requesting the token to obtain the token according to a permission of the source terminal.

The presentation data relay unit may broadcast the presentation image and the voice information in a streaming method.

According to another aspect of the present invention, there is provided a presentation method including: establishing a communication connection with a plurality of receiving terminals and a source terminal, the source terminal having a token corresponding to an authority of controlling a presentation; receiving presentation data from the source terminal, broadcasting a presentation image to the plurality of receiving terminals to display the presentation image of the received presentation data on each screen of the plurality of receiving terminals, and broadcasting voice information to the source terminal and the plurality of receiving terminals to output, from each terminal, the voice information being inputted from any one of the source terminal and the plurality of receiving terminals; and controlling a transmission/reception of the presentation image and the voice information, and controlling the receiving terminal requesting the token to obtain the token.

BRIEF DESCRIPTION OF THE DRAWINGS

The above and other aspects and of the present invention will become apparent and more readily appreciated from the following detailed description of exemplary embodiments of the invention, taken in conjunction with the accompanying drawings of which.

DETAILED DESCRIPTION OF EXEMPLARY
EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
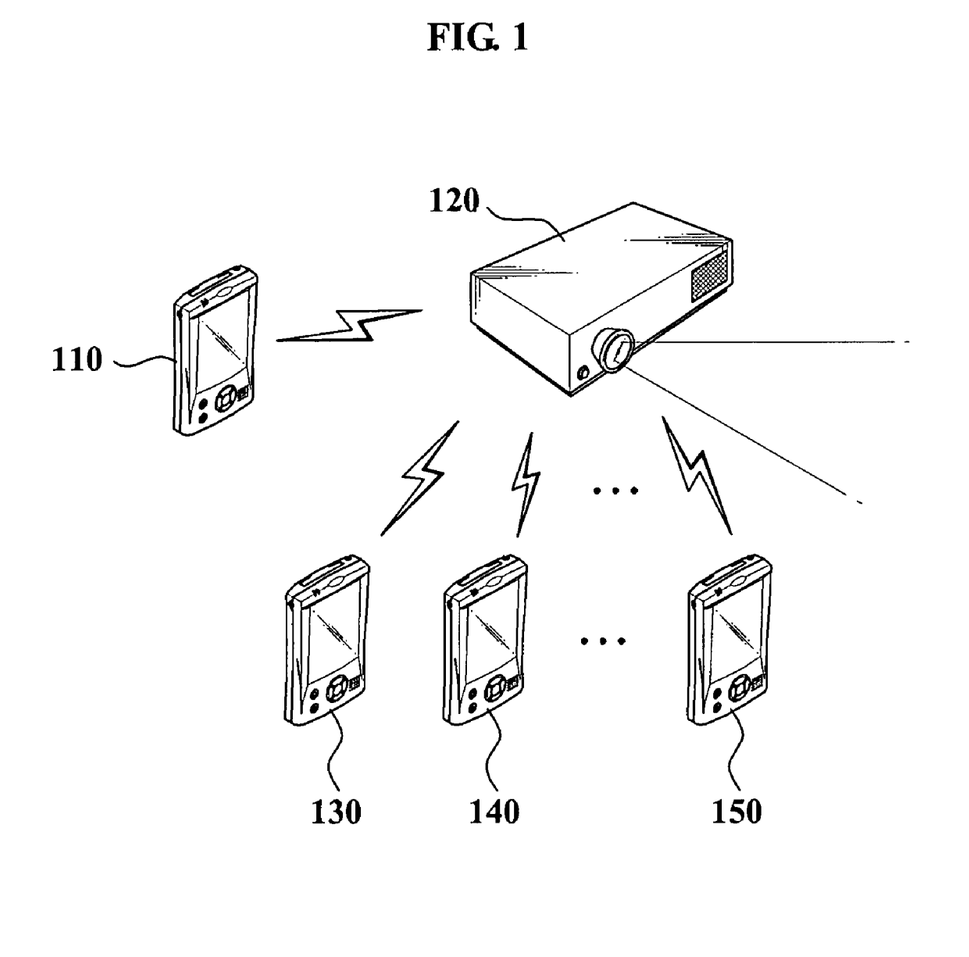
FIG. 1 is a diagram illustrating a presentation apparatus having a broadcasting function according to an exemplary embodiment of the present invention.

FIG. 1 is a diagram illustrating a presentation apparatus having a broadcasting function according to an exemplary embodiment of the present invention. A presentation system includes a source terminal 110, a presentation apparatus 120, and a plurality of receiving terminals 130 through 150.

The source terminal 110 provides the presentation apparatus with presentation data. The source terminal 110 and the presentation apparatus 120 may be connected by a wired or wireless connection. Further, the source terminal 110 may have a token corresponding to an authority to lead a presentation.

The presentation apparatus 120 establishes a communication connection with a plurality of receiving terminals and a source terminal, displays a presentation image included in the presentation data received from the source terminal, as a picture, for example, on a screen, and broadcasts the presentation image displayed on the screen to the plurality of receiving terminals.

The presentation apparatus 120 may broadcast the presentation image to each receiving terminal in a streaming method. Also, the presentation apparatus 120 may broadcast voice data inputted from the source terminal 110 or each of the plurality of receiving terminals 130 through 150, to all terminals connecting with the presentation apparatus, or terminals excluding any terminal providing voice data from terminals connecting with the presentation apparatus. Further, the presentation apparatus 120 may perform the function of assigning the token controlling the presentation image displayed on the screen.

The presentation apparatus 120 may transmit information concerning a token request, to the source terminal 110, when any terminal from among the plurality of receiving terminals 130 through 150 requests the token. Also, when permitted by the source terminal, the presentation apparatus 120 may simply obtain the token which the source terminal 110 possesses, and may have the token assigned to the receiving terminal requesting the token. Accordingly, the source terminal and any one of the plurality of receiving terminals 130 through 150 may have the token.

The plurality of receiving terminals 130 through 150 receive and display the presentation image which the presentation apparatus 120 broadcasts. When the voice data is broadcast from the presentation apparatus 120, the received voice data may be output via a speaker equipped in each of the plurality of receiving terminals 130 through 150.

Each of the plurality of receiving terminals 130 through 150 may be coupled with the presentation apparatus 120 by a wired or wireless connection.

Although not illustrated, the source terminal 110 and the plurality of receiving terminals 130 through 150 may include an image module processing a image, an audio module processing a voice, a communication module performing a local wireless communication with the presentation apparatus, a control module performing various functions such as a token request, a token acquisition, a token abandonment, and the like, among others.

Figure 2:
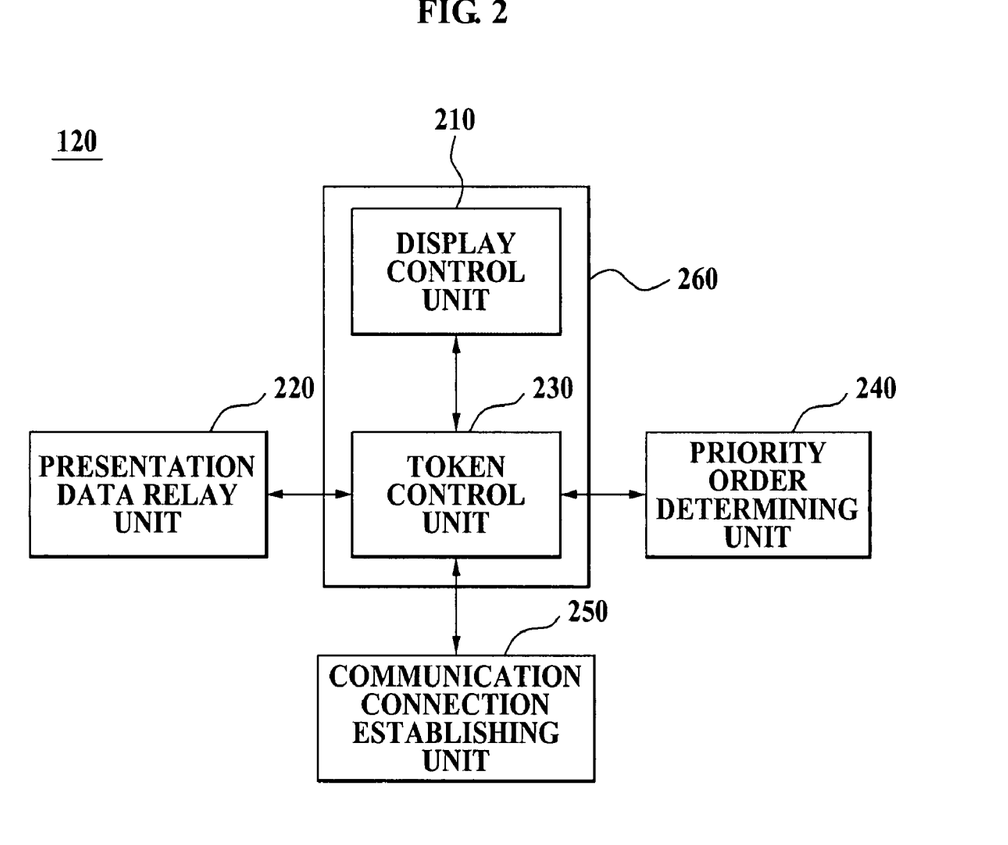
FIG. 2 is a block diagram illustrating a configuration of a presentation apparatus according to an exemplary embodiment of the present invention.

FIG. 2 is a block diagram illustrating a configuration of a presentation apparatus according to an exemplary embodiment of the present invention. Assuming that the presentation apparatus connects the source terminal 110 and each terminal of the plurality of receiving terminals 130 through 150 with the local wireless communication, the configuration of the presentation apparatus is described.

The presentation apparatus 120 includes a presentation data relay unit 220, a priority order determining unit 240, a communication connection establishing unit 250, and a presentation control unit 260.

The communication connection establishing unit 250 establishes a communication connection with the plurality of receiving terminals 130 through 150 and the source terminal 110, the source terminal 110 having the token. Specifically, the communication connection establishing unit 250 receives the presentation data from the source terminal, and establishes a communication connection with the plurality of receiving terminals 130 through 150 and the source terminal 110 to broadcast at least a portion of the received presentation data, for example, a presentation image, to the plurality of receiving terminals 130 through 150.

The communication connection establishing unit 250 may establish a local wireless communication connection or a wired communication connection with the plurality of receiving terminals and the source terminal. Specifically, the plurality of receiving terminals 130 through 150 and the source terminal 110 may be connected by a wired or wireless connection.

The communication connection establishing unit 250 may receive a beacon message transmitted from the plurality of receiving terminals 130 through 150 and the source terminal 110, and establish the local wireless communication connection with the plurality of receiving terminals 130 through 150 and the source terminal 110 using characteristic information of the terminals included in the beacon message.

The communication connection establishing unit 250 may extract the characteristic information included in the beacon message, and establish the local wireless communication connection in a time slice method allocating a connection number with respect to the characteristic information of the terminals, and using the allocated connection number.

The communication connection establishing unit 250 may establish a wired communication connection using a wired communication connection number defined in each of the plurality of receiving terminals 130 through 150 and the source terminal 110, for example, an Internet protocol (IP) address.

The presentation data relay unit 220 receives presentation data from the source terminal 110, and broadcasts at least a portion of the received presentation data to the plurality of receiving terminals 130 through 150. The presentation data which is broadcast to the plurality of receiving terminals 130 through 150 may be the presentation image. Also, the presentation data relay unit 220 may broadcast at least the portion of the received presentation data in a streaming method.

The presentation data relay unit 220 may broadcast the received voice data to the source terminal 110 and the plurality of receiving terminals 130 through 150 when voice data is received from any one of the source terminal 110 and the plurality of receiving terminals 130 through 150.

Each of the terminals excluding the terminal transmitting the voice data from the terminals connecting with the presentation apparatus may receive the broadcast voice data.

The priority order determining unit 240 determines an order of priority, i.e., a priority order, of the terminals connecting with the presentation apparatus. For example, when more than one terminal from among the plurality of receiving terminals requests the token controlling the presentation image received from the source terminal and displayed on the screen, for example, performing page up/down cursor movement, editing of presentation contents, and the like, each receiving terminal to which the token that the source terminal possesses is assigned may be selected based on the priority order as determined by the priority order determining unit 240. Here, the token may be simply assigned, in the determined priority order, to each receiving terminal according to a permission of the source terminal.

The presentation control unit 260 controls displaying of the presentation image on the screen, controls each receiving terminal requesting the token among the plurality of receiving terminals 130 through 150 to obtain the token in the priority order, and controls a transmission/reception of the presentation image and the voice information. The presentation control unit 260 includes a token control unit 230 and a display control unit 210. The presentation data relay unit 220 may control the transmission/reception of the presentation image and the voice information, and any one of the token control unit 230 and the display control unit 210 may perform the function of controlling the transmission/reception of the presentation image and the voice information.

The token control unit 230 responds to any token request from the plurality of receiving terminals 130 through 150, enables the source terminal 110 to release the token, and enables any one of the plurality of receiving terminals requesting the token to obtain the token in the priority order, released from the source terminal.

The source terminal 110 releases the token which the source terminal 110 possesses to assign the token to any one of the plurality of receiving terminals in the priority order, and has an authority of controlling the presentation and an authority of removing the token assigned to any one of the plurality of receiving terminals. Also, the source terminal 110 may provide the token so that any one of the plurality of receiving terminals requesting the token may control the presentation in the priority order, in a status when the source terminal 110 possesses the token without releasing the token.

For example, a request from the terminal to the token control unit 230 for the token may be made so that any one of the terminals connecting with the presentation apparatus may control the presentation, and the token control unit 230 may assign the token to any one of the plurality of receiving terminals 130 through 150, based on the priority order determined according to the permission of the source terminal and the priority order determining unit 240. Specifically, when the token is requested by the plurality of receiving terminals 130 through 150, the token control unit 230 reports, to the source terminal 110, token request information with respect to the receiving terminal having the highest priority in the priority order determined by the priority order determining unit 240. Also, the token control unit 230 receives, from the source terminal 110, information with respect to the permission, and assigns the token to the receiving terminal having the highest priority among the plurality of receiving terminals requesting the token.

The display control unit 210 controls displaying of the image, included in the presentation data, on the screen.

An operation with respect to the presentation apparatus according to the exemplary embodiment including the above configuration is described below.

First, a process of connecting the presentation apparatus and the terminal is described.

When an electric power source is input to the presentation apparatus (for example, a projector), the communication connection establishing unit 250 is operated in a mode for receiving a message broadcasted from the terminal, for example, a beacon message, to establish a local wireless communication connection with the source terminal and each receiving terminal.

The beacon message may include the characteristic information of the terminal, and may be simply received in the presentation apparatus.

When the communication connection establishing unit 250 receives the beacon message, a connection number is allocated, based on the characteristic information of each terminal included in the corresponding beacon message, and the information is transmitted to the terminal. When the terminal receives the connection number which the presentation apparatus allocates, the local wireless communication connection with the terminal and the presentation apparatus is performed.

When each terminal connects with the presentation apparatus in a time slice method for efficiency of the communication, the connection number is used along with information concerning a period of time.

The above processes are performed between the presentation apparatus and the source terminal 110, and between the presentation apparatus and each of the plurality of receiving terminals 130 through 150.

When the terminals, i.e. the source terminal 110 and each of the plurality of receiving terminals 130 through 150, and the presentation apparatus connect with each other, the source terminal 110 transmits the presentation data, i.e. the presentation image and the voice data, to the presentation apparatus via the communication module equipped in the terminal. Also, when the presentation excludes the voice data, the source terminal 110 simply transmits the presentation image.

When the presentation data is received from the source terminal 110, the presentation apparatus displays, on the screen, the presentation image included in the presentation data via the controlling of the display control unit 210, and substantially simultaneously broadcasts the presentation image from the presentation data relay unit 220 to the plurality of receiving terminals 130 through 150 in the streaming method.

The plurality of receiving terminals 130 through 150 connecting with the presentation apparatus receives the broadcasted presentation image, and displays the presentation image on the screen.

Figure 3:
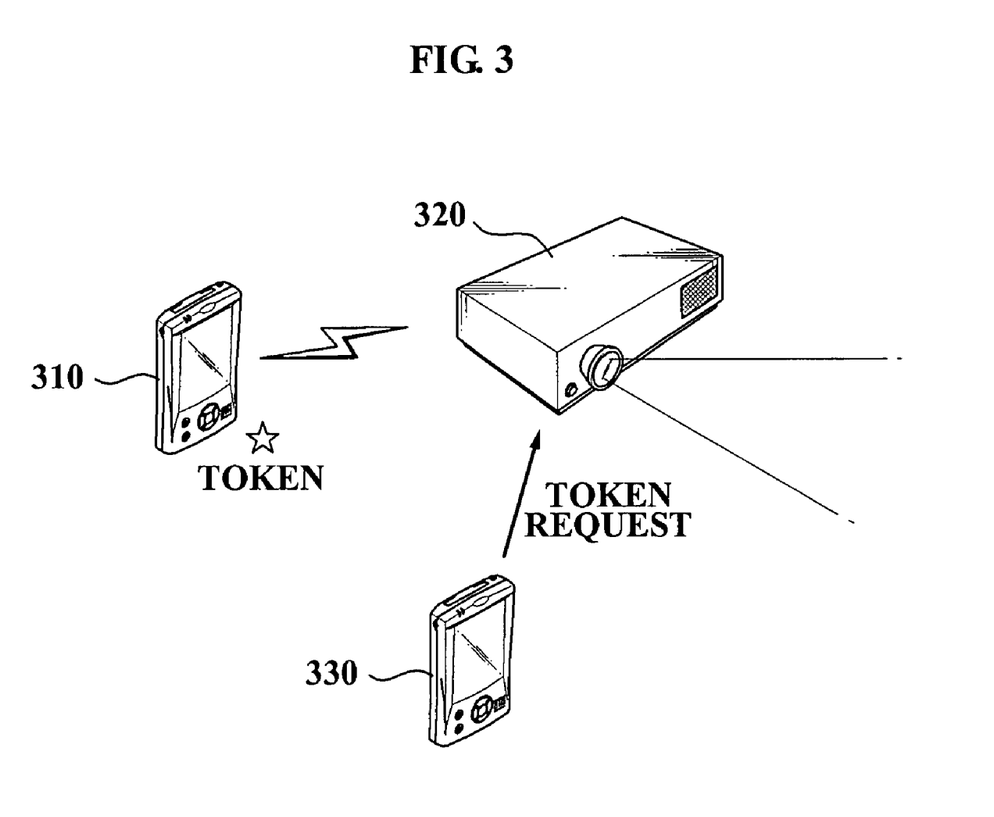
FIG. 3 is a diagram illustrating a token request process according to an exemplary embodiment of the present invention.

When a user of each receiving terminal proceeds with the presentation during the presentation, the user requests, to the presentation apparatus 320, the token corresponding to the authority of controlling the presentation, as illustrated in FIG. 3. Here, the token corresponds to the authority of controlling the presentation, and the terminal possessing the token controls the presentation.

FIG. 3 is a diagram illustrating a token request process according to an exemplary embodiment of the present invention. A presentation system simply uses one token. Specifically, one terminal of a plurality of terminals may control the presentation.

When the user of a receiving terminal 330 makes a request for the token, i.e. a token request, corresponding to the authority of controlling the presentation to the presentation apparatus via an operation of the terminal, the token control unit 230 transmits information with respect to the token request to a source terminal if the number of receiving terminals requesting the token is one.

Conversely, when the number of receiving terminals making a request for the token to the presentation apparatus is greater than one, the token control unit 230 transmits, to the source terminal, the information with respect to the token request from the receiving terminal having the highest priority among the plurality of receiving terminals requesting the token, based on the priority order determined by the priority order determining unit 240. In this instance, the token control unit 230 may simply transmit, to the source terminal, the information that the token request is performed from the receiving terminal, as opposed to the information with respect to the token request of the receiving terminal having the highest priority.

Here, a case when the token is requested from one receiving terminal, as opposed to the plurality of receiving terminals, is described with reference to FIG. 4.

Figure 4:
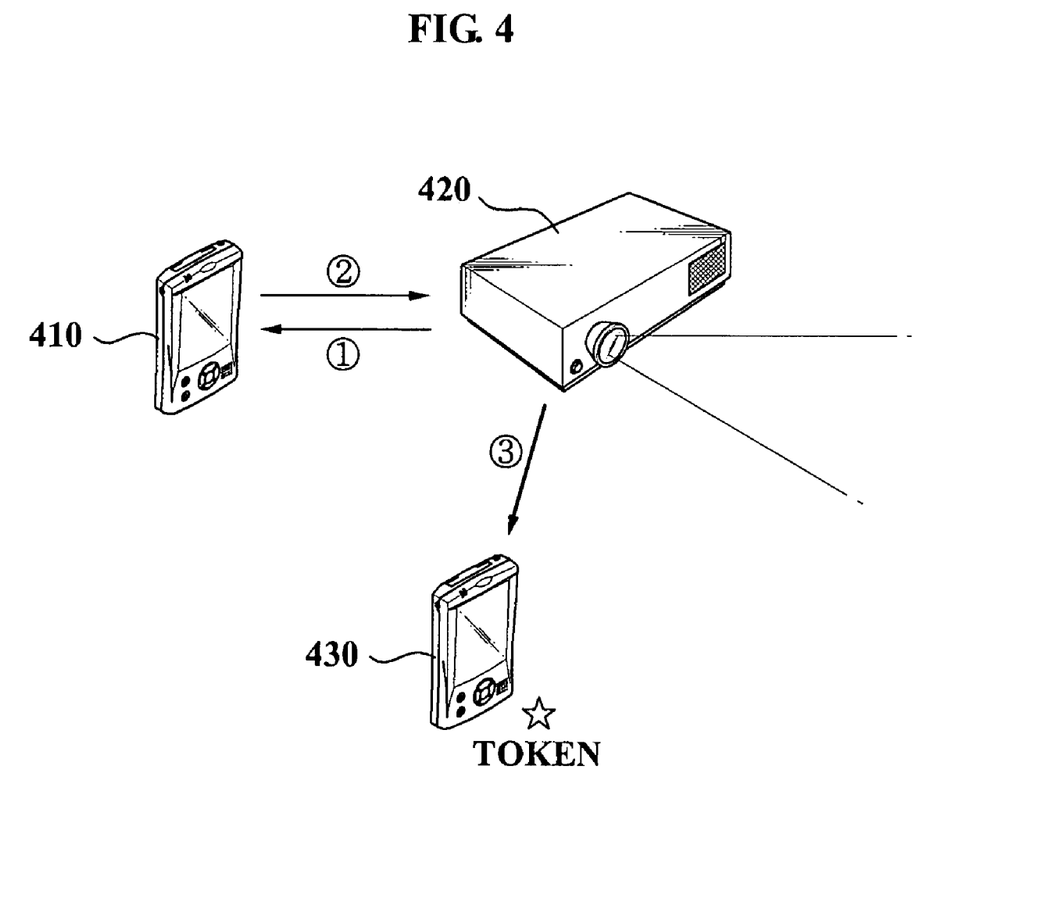
FIG. 4 is a diagram illustrating a process of assigning a token according to an exemplary embodiment of the present invention.

FIG. 4 is a diagram illustrating a process of assigning a token according to an exemplary embodiment of the present invention When a receiving terminal 430 makes a request for the token to the presentation apparatus, the token control unit 230 of a presentation apparatus 420 transmits the information with respect to a token request ① to a source terminal 410, and when the source terminal 410 permits the token request, the source terminal 410 releases the token, as illustrated in FIG. 4.

The token control unit 230 receives the token ② released from the source terminal 410, and assigns the token ③ to the receiving terminal 430 requesting the token.

The receiving terminal 430 where the token is assigned controls the presentation input from the source terminal 410 to the presentation apparatus 420. For example, the receiving terminal where the token is assigned may use a function which the source terminal may perform, such as presentation page up/down, cursor movement, editing of presentation contents, and the like. Also, one skilled in the art would understand that a function key performing the function such as presentation page up/down, cursor movement, editing of presentation contents, and the like may be predetermined.

A more specific description with respect to a presentation control process of the receiving terminal where the token is assigned, is given below with reference to FIG. 5.

Figure 5:
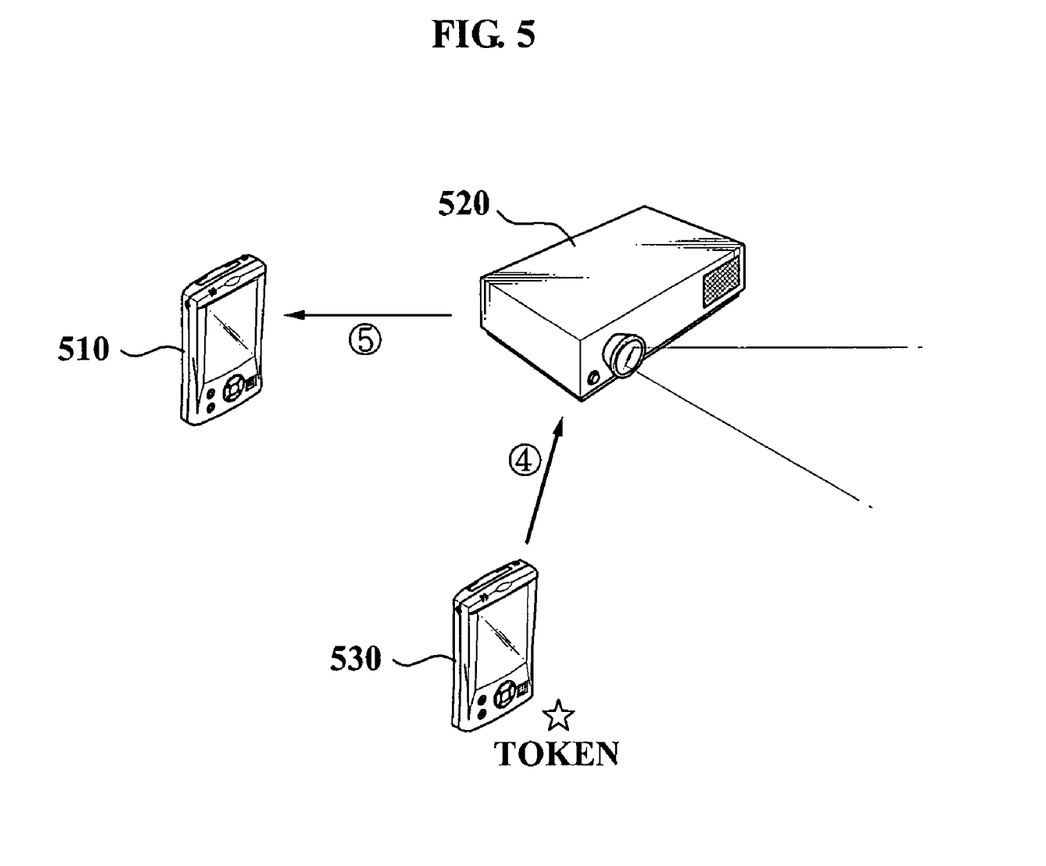
FIG. 5 is a diagram illustrating a process of controlling a presentation in a terminal where a token is assigned according to an exemplary embodiment of the present invention.

FIG. 5 is a diagram illustrating a process of controlling a presentation in a terminal where a token is assigned according to an exemplary embodiment of the present invention.

As illustrated in FIG. 5, when a receiving terminal 530 where the token is assigned performs the function of controlling the presentation, the information ④ with respect to the performed function is transmitted to a presentation apparatus 520, and a presentation apparatus 520 transmits, to a source terminal 510, the information ⑤ corresponding to the information with respect to the presentation function performed in the receiving terminal.

In this instance, the information ⑤ transmitted to the source terminal 510 may correspond to the information ④ with respect to the function performed in the receiving terminal 530. The source terminal 510 receives the above information ⑤, and performs the corresponding function.

When the source terminal 510 performs the function, the presentation data related thereto is transmitted to the presentation apparatus 520 again, and the presentation image is outputted on the screen of the presentation apparatus, and is substantially simultaneously broadcasted to the plurality of receiving terminals connecting with the presentation apparatus.

Also, when voice data is inputted in the receiving terminal where the token is assigned, the inputted voice data is transmitted to the presentation apparatus, and the presentation data relay unit of the presentation apparatus broadcasts the inputted voice data to the source terminal and the plurality of receiving terminals connecting with the presentation apparatus in the streaming method. Specifically, since the voice data inputted in the receiving terminal does not pass through the source terminal, the voice data is directly broadcasted in the presentation apparatus.

The presentation apparatus according to the exemplary embodiments may broadcast the presentation received from the source terminal, and check the presentation in the receiving terminal connecting with the presentation apparatus in the local wireless communication connection. Also, the receiving terminal to be assigned with the token by the presentation apparatus may control the presentation. Also, when the function of recording the presentation is equipped in the receiving terminal, the presentation contents may be stored and checked without downloading a presentation file.

Figure 6:
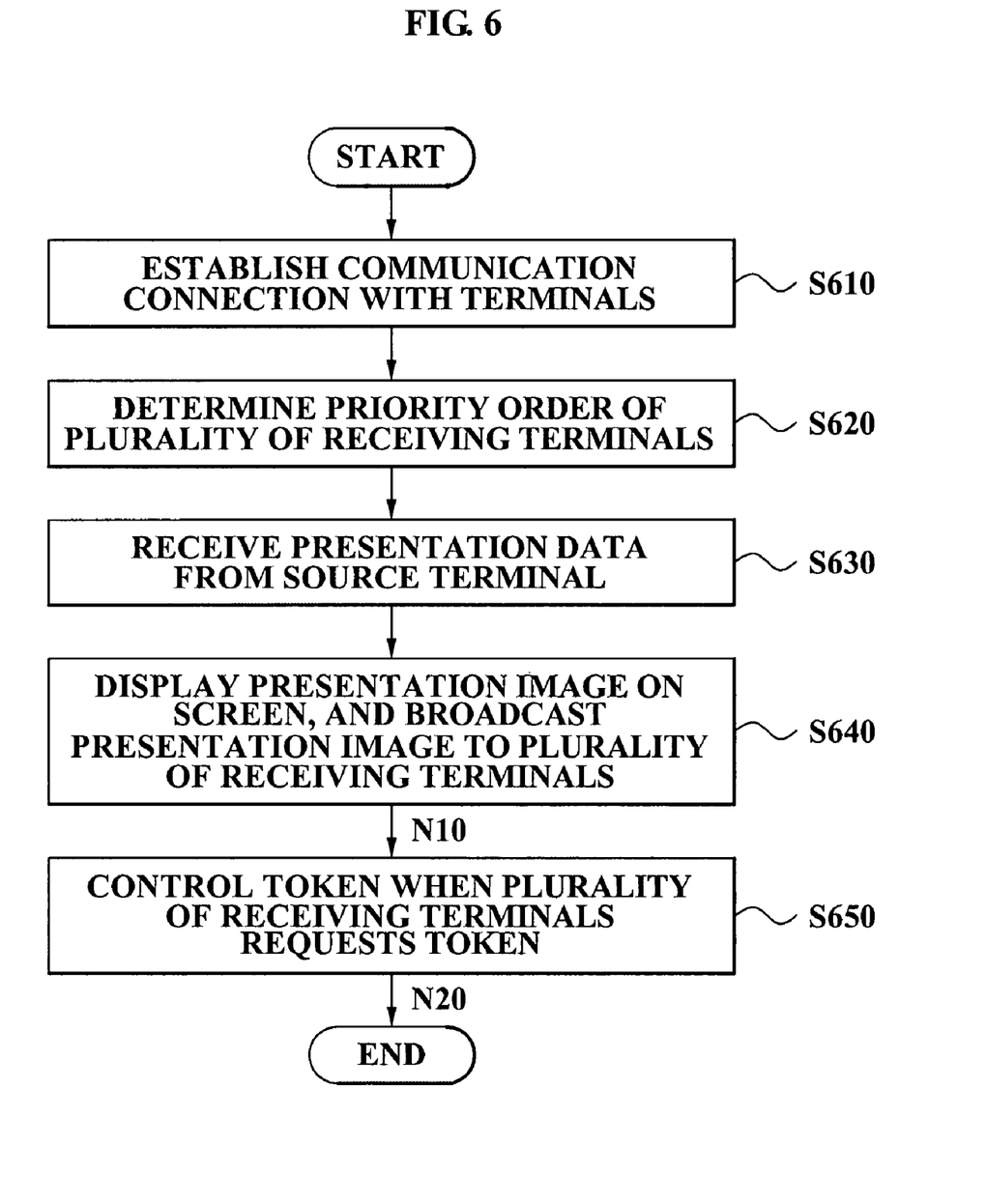
FIG. 6 is a flowchart illustrating an operation with respect to a presentation method according to an exemplary embodiment of the present invention.

FIG. 6 is a flowchart illustrating an operation with respect to a presentation method according to an exemplary embodiment of the present invention. The presentation apparatus establishes a communication connection between a plurality of receiving terminals and a source terminal, the source terminal having a token, and the presentation apparatus according to the presentation method of the present invention (operation S610). The presentation apparatus may establish the local wireless communication connection or the wired communication connection with terminals.

Further, the presentation apparatus may receive the beacon message transmitted from each of the source terminal and the plurality of receiving terminals, and extract, from each beacon message, the characteristic information of each of the terminals. Also, the presentation apparatus may allocate a connection number, based on the extracted characteristic information of each of the terminals, transmit the allocated connection number to the terminal, and thereby connect the local wireless communication connection between the presentation apparatus and the terminals.

The presentation apparatus may establish a wired communication connection using a wired communication connection number defined in each of the plurality of receiving terminals and the source terminal, for example, an IP address.

After operation S610, a priority order with respect to the plurality of receiving terminals connecting with the presentation apparatus is determined (operation S620).

The priority order may be determined by the characteristic information of each of the terminals. Further, the priority order may be applied when requesting the token controlling the presentation such as a presentation authority request, a presentation authority acquisition, a presentation authority abandonment, and the like. Specifically, when the plurality of receiving terminals simultaneously requests the token, the token corresponding to the authority of controlling the presentation may be assigned to the receiving terminal having the highest priority, based on the priority order determined according to the permission of the source terminal. The token assigned to the receiving terminal corresponds to the token released from the source terminal.

The presentation apparatus receives the presentation data from the source terminal, displays the presentation image included in the presentation data on the screen, and simultaneously broadcasts the presentation image to the plurality of receiving terminals (operations S630 and S640).

The presentation image may be broadcasted in the streaming method.

When each receiving terminal requests the token corresponding to the authority of controlling the presentation during the presentation of the source terminal, the presentation apparatus controls the token (operation S650).

When each receiving terminal directly performs the presentation function, or desires to perform the determined function concerning the presentation such as submitting a question, and the like, each receiving terminal may request the token with respect to the presentation.

Figure 7:
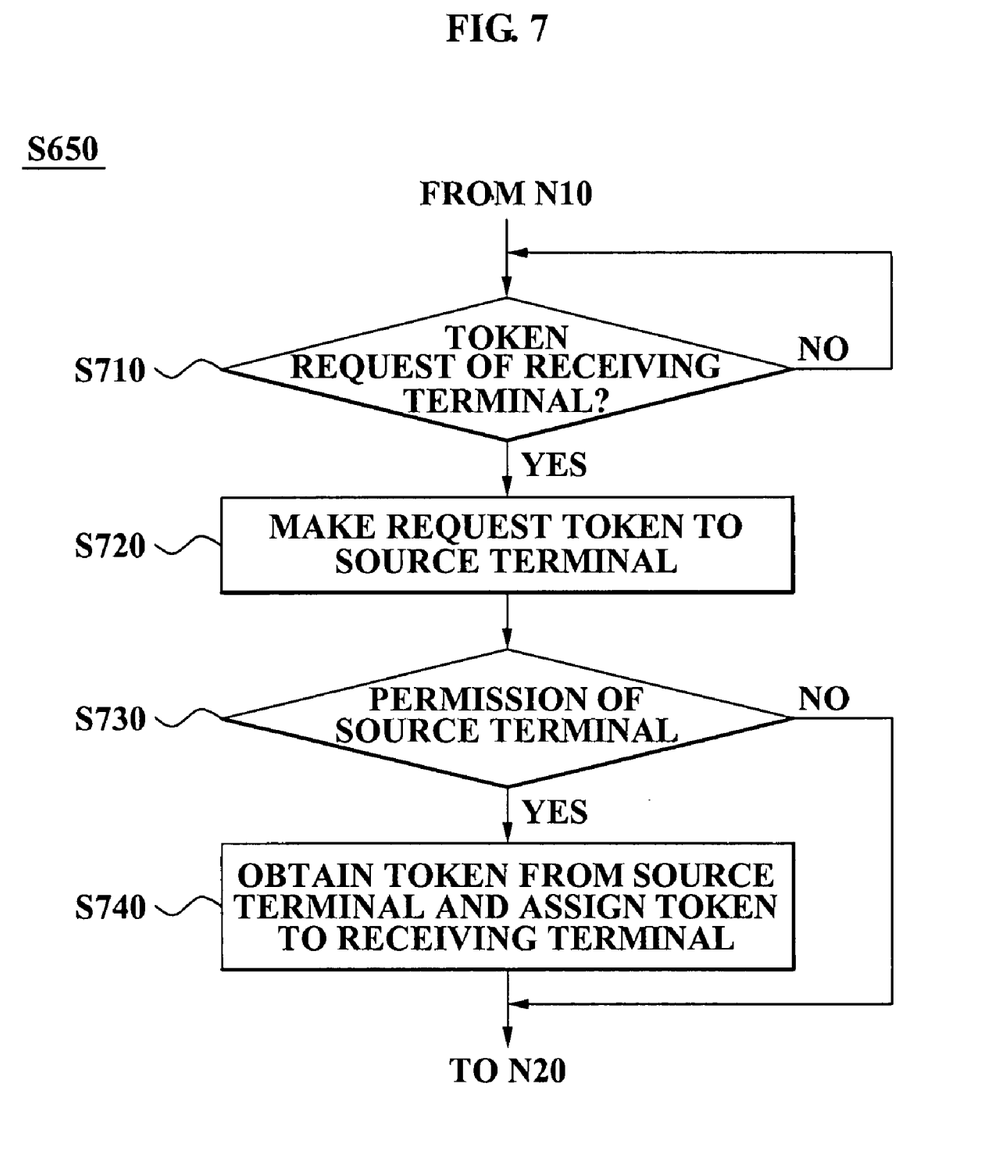
FIG. 7 is a flowchart illustrating a detailed operation with respect to operation S650 of FIG. 6.

FIG. 7 is a flowchart illustrating a detailed operation with respect to operation S650 of FIG. 6.

Referring to FIG. 7, the controlling of the token in the presentation apparatus (operation S650) determines whether the token corresponding to the authority of controlling the presentation from each receiving terminal connecting with the presentation apparatus is requested (operation S710).

When each receiving terminal requests the token, it is reported to the source terminal that the token is requested, and the token is requested which the source terminal possesses (operation S720).

The information reported to the source terminal may include (but is not limited to) token request information and information concerning any one of the plurality of receiving terminals requesting the token. When the number of the receiving terminals requesting the token is greater than one, the presentation apparatus may transmit, to the source terminal, the information with respect to the receiving terminal having the highest priority order, based on the determined priority order, and the token request information.

When the source terminal determines whether to permit the token request (operation S730), and permits the token request; the source terminal releases the token, and the presentation apparatus receives the token released from the source terminal, and assigns the token to any one of the plurality of receiving terminals requesting the token (operation S740).

In this instance, when the number of the receiving terminals requesting the token to the presentation apparatus is greater than one, and the presentation apparatus simply transmits the token request information to the source terminal, the token released from the source terminal is received, and the received token is assigned to the receiving terminal having the highest priority among the plurality of receiving terminals requesting the token, based on the determined priority order.

When the token is assigned to the receiving terminal, a user of the receiving terminal where the token is assigned controls the presentation. For example, the receiving terminal where the token is assigned performs an operation such as presentation page up/down, cursor movement of the presentation, editing of presentation contents, and the like.

Also, when the voice data is inputted from the receiving terminal where the token is assigned, the inputted voice data is transmitted to the presentation apparatus, and the presentation apparatus may broadcast the voice data to the source terminal and the plurality of receiving terminals.

The voice data may be broadcasted in a streaming method. Further, the broadcasted voice data may be received by each terminal, and be outputted via a speaker equipped in the terminal.

A presentation method according to the above-described exemplary embodiment may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the exemplary embodiments of the present invention, there is provided a presentation apparatus and method, which can broadcast a presentation image and a voice received from a terminal, and check presentation contents in a receiving terminal connecting with the presentation apparatus in a local wireless communication connection.

Also, according to the exemplary embodiments of the present invention, it is possible to ensure security with respect to presentation contents by broadcasting an image and a voice in a streaming method.

Also, according to the exemplary embodiments of the present invention, it is possible to broadcast presentation contents where security is ensured with a counterpart terminal located in another location away from a presentation location, and check the presentation contents from a long distance.

Also, according to the exemplary embodiments of the present invention, it is possible to assign, to a receiving terminal requesting a token, the token controlling a presentation according to a permission of a source terminal providing the presentation, the receiving terminal assigned the token leads the presentation.

Although a few exemplary embodiments of the present invention have been shown and described, the present invention is not limited to the described exemplary embodiments. Instead, it is appreciated by those skilled in the art that changes may be made to these exemplary embodiments without departing from the principles and spirit of the invention, the scope of which is defined by the claims and their equivalents.

What is claimed is:

1. A projector comprising:
a communication connection establishing unit which establishes a communication connection with a plurality of terminals over a network, the plurality of terminals including a plurality of receiving terminals and a source terminal, the plurality of receiving terminals including a first receiving terminal having a token that grants the receiving terminal authority to control the source terminal over the network through the projector, the communication connection establishing unit receiving from the source terminal a presentation transmitted over the network to the projector;
a lens through which the presentation is projected to display the presentation;
a presentation data relay unit which receives presentation data of the presentation from the source terminal over the network, broadcasts a presentation image to the plurality of receiving terminals over the network so as to display the presentation image of the received presentation data on each of the plurality of receiving terminals, and, while broadcasting the presentation image to the plurality of receiving terminals, broadcasts voice information received from at least one terminal among the plurality of terminals to the plurality of terminals other than the at least one terminal so as to output, from each of the plurality of terminals other than the at least one terminal, the voice information input from the at least one terminal;

a priority order determining unit which determines a priority order of the plurality of receiving terminals; and a presentation control unit which controls at least one of transmission and reception of the presentation image and the voice information, receives from a second receiving terminal and a third receiving terminal among the plurality of receiving terminals a request to control the source terminal, assigns the token to one of the second receiving terminal and the third receiving terminal having a highest priority among the second receiving terminal and the third receiving terminal requesting the token, receives from the one of the second receiving terminal and the third receiving terminal assigned the token a command to control the presentation transmitted by the source terminal, and transmits the command to the source terminal, wherein the source terminal receives the command from the presentation control unit, controls the presentation in accordance with the command, and transmits the controlled presentation to the communication connection establishing unit.

2. The projector of claim 1, wherein the communication connection establishing unit establishes a wireless communication connection over the network with the plurality of receiving terminals and the source terminal using characteristic information of the terminals transmitted from the plurality of receiving terminals and the source terminal.

3. The projector of claim 1, wherein the communication connection establishing unit establishes a wired communication connection over the network using a wired communication connection number defined in each of the plurality of receiving terminals and the source terminal.

4. The projector of claim 1, wherein the presentation control unit responds to a token request of any one of the plurality of receiving terminals, and enables the receiving terminal requesting the token to obtain the token according to a permission of the source terminal.

5. The projector of claim 1, wherein the presentation data relay unit broadcasts the presentation image and the voice information in a stream.

6. A presentation method comprising:

establishing a communication connection between a projector and a plurality of terminals over a network, the plurality of terminals including a plurality of receiving terminals and a source terminal, the plurality of receiving terminals including a first receiving terminal having a token that grants the receiving terminal authority to control the source terminal over the network through the projector;

receiving from the source terminal a presentation transmitted over the network and displaying the presentation through a lens of the projector;

receiving presentation data of the presentation from the source terminal over the network, broadcasting a presentation image to the plurality of receiving terminals over the network to display the presentation image of the received presentation data on each of the plurality of receiving terminals, and, while broadcasting the presentation image to the plurality of receiving terminals, broadcasting voice information received from at least one terminal among the plurality of terminals to the plurality of terminals other than the at least one terminal so as to output, from each of the plurality of terminals other than the at least one terminal, the voice information being input from the at least one terminal;

determining a priority order of a plurality of receiving terminals; and controlling at least one of transmission and reception of the presentation image and the voice information, receiving from a second receiving terminal and a third receiving terminal among the plurality of receiving terminals a request to control the source terminal, assigning the token to one of the second receiving terminal and the third receiving terminal having a highest priority among the plurality of receiving terminals requesting the token, receiving from the one of the second receiving terminal and the third receiving terminal assigned the token a command to control the presentation transmitted by the source terminal, transmitting the command to the source terminal, and receiving from the source terminal the presentation controlled in accordance with the command.

7. The presentation method of claim 6, wherein the establishing establishes a wireless communication connection over the network with the plurality of receiving terminals and the source terminal using characteristic information of the terminals transmitted from the plurality of receiving terminals and the source terminal.

8. The presentation method of claim 6, wherein the establishing establishes a wired communication connection over the network using a wired communication connection number defined in each of the plurality of receiving terminals and the source terminal.

9. The presentation method of claim 6, wherein the controlling of the receiving terminal responds to a token request of any one of the plurality of receiving terminals, and enables the receiving terminal requesting the token to obtain the token according to a permission of the source terminal.

10. The presentation method of claim 6, wherein the broadcasting broadcasts the presentation image and the voice information in a streaming method.

11. A non-transitory computer-readable recording medium storing a program for a presentation method that comprises:

establishing a communication connection between a projector and a plurality of terminals over a network, the plurality of terminals including a plurality of receiving terminals and a source terminal, the plurality of receiving terminals including a first receiving terminal having a token that grants the receiving terminal authority to control the source terminal over the network through the projector;

receiving from the source terminal a presentation transmitted over the network and displaying the presentation through a lens of the projector;

receiving presentation data of the presentation from the source terminal over the network, broadcasting a presentation image to the plurality of receiving terminals over the network to display the presentation image of the received presentation data on each of the plurality of receiving terminals, and, while broadcasting the presentation image to the plurality of receiving terminals, broadcasting voice information received from at least one terminal among the plurality of terminals to the plurality of terminals other than the at least one terminal so as to output, from each of the plurality of terminals other than the at least one terminal, the voice information being input from the at least one terminal;

determining a priority order of a plurality of receiving terminals; and controlling at least one of transmission and reception of the presentation image and the voice information, receiving from a second receiving terminal and a third receiving terminal among the plurality of receiving terminals a request to control the source terminal, assigning the token to one of the second receiving terminal and the third receiving terminal having a highest priority among the plurality of receiving terminals requesting the token, receiving from the one of the second receiving terminal and the third receiving terminal assigned the token a command to control the presentation transmitted by the source terminal, transmitting the command to the source terminal, and receiving from the source terminal the presentation controlled in accordance with the command.

12. The computer readable medium of claim 11, wherein the establishing establishes a wired communication connection over the network using a wired communication connection number defined in each of the plurality of receiving terminals and the source terminal.

13. The computer readable medium of claim 11, wherein the controlling of the receiving terminal responds to a token request of at least one of the plurality of receiving terminals, and enables the receiving terminal requesting the token to obtain the token according to a permission of the source terminal.

14. The computer readable medium of claim 11, wherein the broadcasting broadcasts the presentation image and the voice information in a streaming method.

* * * * *